United States Patent
Glozman et al.

(10) Patent No.: US 10,972,881 B1
(45) Date of Patent: Apr. 6, 2021

(54) SYSTEM, METHOD, AND COMPUTER PROGRAM FOR NETWORK SLICE CHARGING MANAGEMENT

(71) Applicant: Amdocs Development Limited, Limassol (CY)

(72) Inventors: Borislav Glozman, Ramat Gan (IL); Alla Goldner, Tel Aviv (IL); Andrei Kojukhov, Rishon Le Zion (IL); Avi Chapnick, Ramat Gan (IL)

(73) Assignee: AMDOCS DEVELOPMENT LIMITED, Limassol (CY)

(*) Notice: Subject to any disclaimer, the term of this patent is extended or adjusted under 35 U.S.C. 154(b) by 0 days.

(21) Appl. No.: 16/683,049

(22) Filed: Nov. 13, 2019

(51) Int. Cl.
H04M 11/00 (2006.01)
H04W 4/24 (2018.01)
H04L 12/14 (2006.01)

(52) U.S. Cl.
CPC ............ *H04W 4/24* (2013.01); *H04L 12/1403* (2013.01)

(58) Field of Classification Search
CPC .............................. H04W 4/24; H04L 12/1403
USPC .......................................................... 455/408
See application file for complete search history.

(56) References Cited

U.S. PATENT DOCUMENTS

| | | | |
|---|---|---|---|
| 10,111,163 B2* | 10/2018 | Vrzic | H04W 28/0247 |
| 10,321,285 B2* | 6/2019 | Senarath | H04M 15/8016 |
| 10,321,371 B2* | 6/2019 | Zhang | H04W 36/22 |
| 10,361,843 B1* | 7/2019 | Suthar | H04L 9/3247 |
| 10,609,608 B2* | 3/2020 | Park | H04W 76/20 |
| 2018/0139106 A1* | 5/2018 | Senarath | H04L 67/16 |
| 2018/0367997 A1* | 12/2018 | Shaw | H04W 12/0804 |
| 2019/0149998 A1* | 5/2019 | Yang | H04W 16/04 370/328 |
| 2019/0281587 A1* | 9/2019 | Zhang | H04L 5/0044 |
| 2019/0327317 A1* | 10/2019 | Lu | H04L 67/32 |
| 2019/0357130 A1* | 11/2019 | Garcia Azorero | H04W 48/18 |
| 2020/0045548 A1* | 2/2020 | Dowlatkhah | H04W 12/08 |
| 2020/0068074 A1* | 2/2020 | Cai | H04W 4/24 |

FOREIGN PATENT DOCUMENTS

WO  WO-2019210476 A1 * 11/2019 ............ H04W 72/08

* cited by examiner

*Primary Examiner* — Amancio Gonzalez
(74) *Attorney, Agent, or Firm* — Zilka-Kotab, P.C.

(57) ABSTRACT

As described herein, a system, method, and computer program are provided for managing charging for network slices. In use, a network slice management function manages a lifecycle of a network slice instance. Additionally, the network slice management function monitors the network slice instance for one or more chargeable events. Further, the network slice management function detects a chargeable event of the one or more chargeable events for the network slice instance, based on the monitoring. Still yet, the network slice management function triggers charging for the chargeable event.

18 Claims, 5 Drawing Sheets

SYSTEM, METHOD, AND COMPUTER PROGRAM FOR NETWORK SLICE CHARGING MANAGEMENT

FIELD OF THE INVENTION

The present invention relates to network management, and more particularly to managing charging for network slices.

BACKGROUND

Network slicing typically refers to a type of virtual networking architecture in which multiple virtual networks can be created from a shared physical network infrastructure. The virtual networks, referred to as network slice instances (NSIs), are logical (software-based) partitions of the shared resources of the physical network, such as the compute and storage resources of the physical network. Each NSI is also composed of a set of network function instances which require the shared resource partition. To this end, each NSI may be utilized to provide a particular network service. The NSIs may be deployed to provide the network services to different entities (e.g. businesses) per the requirements of those entities.

Recently, a network slice management function (NSMF) has been introduced for maintaining NSIs. The NSMF is an orchestration function responsible for life-cycle management of the NSIs created from a physical network. The NSMF is configured to maintain specific quality of service (QoS) and service level agreement (SLA) for each NSI, and can further handle each NSI differently based on policies, entity preferences, etc.

However, currently, the NSMF is limited in functionality. For example, the NSMF is currently not configured to handle chargeable events for NSIs. It is a similar case for the Communication Service Management Function (CSMF) and the Network Slice Subnet Management Function (NSSMF). Instead, charging for NSIs has generally required a separate network slice selection function (NSSF), session management function (SMF), and user plain function (UPF) communicating to an online or offline charging function. In particular, the NSSF has been responsible for transferring network slice identification to the charging function, while the SMF and UPF have been responsible for maintaining the user session and transferring user session information to the charging function, so that the charging function is able to charge based on the slice identification and user session information. Accordingly, charging for NSIs has traditionally been limited to session-based charging.

There is thus a need for addressing these and/or other issues associated with the prior art.

SUMMARY

As described herein, a system, method, and computer program are provided for managing charging for network slices. In use, a network slice management function manages a lifecycle of a network slice instance. Additionally, the network slice management function monitors the network slice instance for one or more chargeable events. Further, the network slice management function detects a chargeable event of the one or more chargeable events for the network slice instance, based on the monitoring. Still yet, the network slice management function triggers charging for the chargeable event.

DETAILED DESCRIPTION

Figure 1:
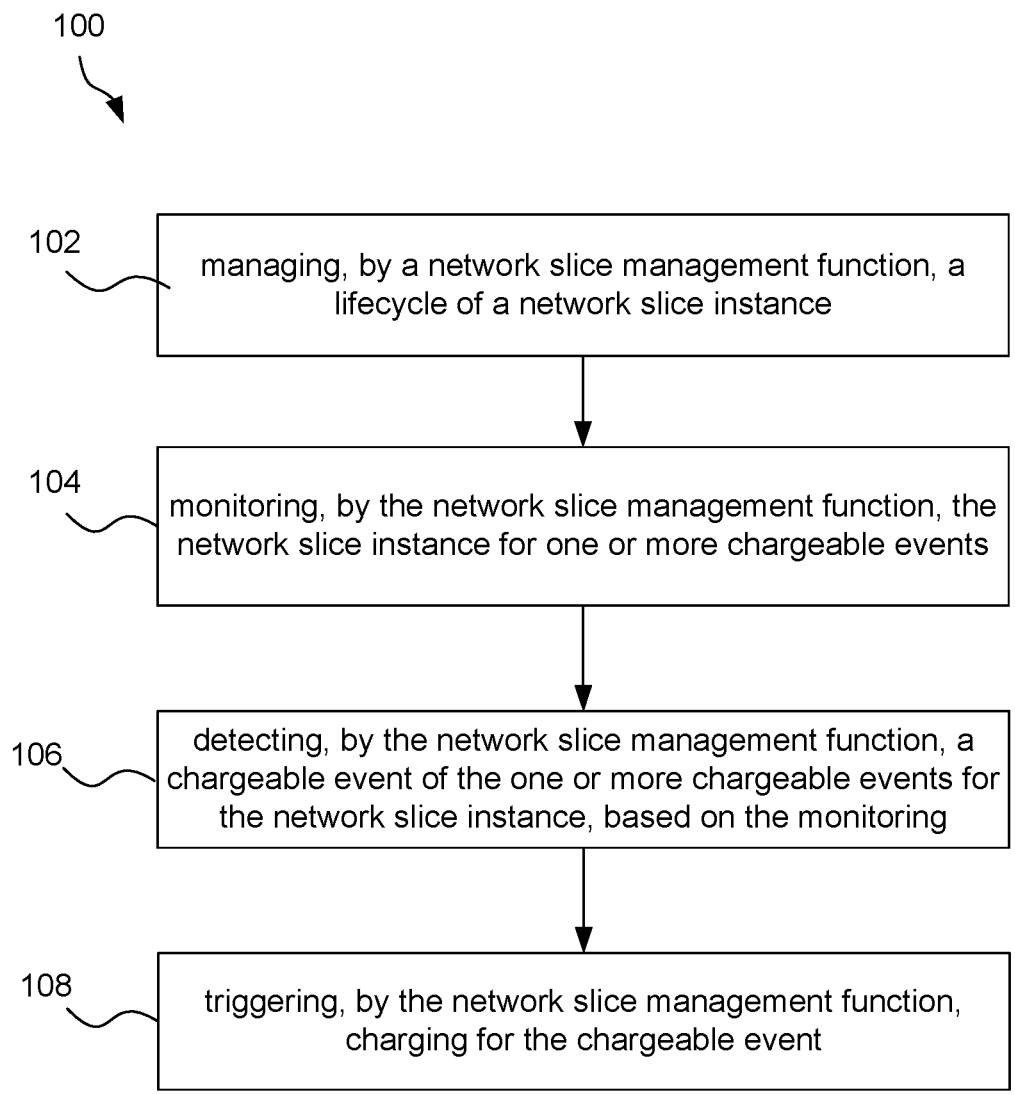
FIG. 1 illustrates a method for managing charging for network slices, in accordance with one embodiment.

FIG. 1 illustrates a method 100 for managing charging for network slices, in accordance with one embodiment. In the context of the present embodiment, the method 100 is performed by a network slice management function (NSMF). The NSMF may be implemented in hardware, software, or a combination thereof. In the context of the present description, the NSMF is an orchestration function executing in a physical or virtual network.

As shown in operation 102, a lifecycle of a network slice instance is managed. In the context of the present description, the network slice instance is any defined instance of a network slice created from a physical network. In one embodiment, the network slice instance may form a network service, or network service instance, available to one or more entities (e.g. subscribers, customers, etc.) of the physical network.

For example, the network slice instance may include a set of network function instances, or instances of one or more various preconfigured network functions. The set of network function instances may form the network service, in one embodiment. As a further example, the network slice instance may include resources of the physical network required for the set of network function instances. The resources may be storage, compute, networking, etc. resources of the physical network.

As an option, the network slice instance may be defined for a particular entity. To this end, the network slice instance may be activated in the physical network for use by the particular entity. In one embodiment, the network slice instance may be defined according to parameters (e.g. specified by the particular entity). The parameters may include, for example, functionality requirements (e.g. priority among other network slice instances, chargeable events, policy control, security, mobility, etc.), performance requirements (e.g. latency, mobility, availability, reliability, data rates, etc.), and/or an indication of whether the network slice instance only serves specific types of end-users.

As noted above, the lifecycle of the network slice instance is managed. The lifecycle may include the creation, activation, modification, and/or termination of the network slice instance. These lifecycle stages will be described in more detail below. As noted above, the network slice instance is managed by the NSMF. In this way, the lifecycle of the network slice instance may be centrally managed.

Additionally, as shown in operation 104, the network slice instance is monitored for one or more chargeable events. The chargeable events may each include any event (i.e. function) capable of being executed (e.g. in the physical network) in association with the network slice instance. The event may be triggered manually (e.g. by the entity for which the network slice instance is defined or the network operator) or automatically (e.g. based on rules configured by the entity or the network operator). Thus, the network slice instance may be monitored by monitored events occurring in the physical network in association with the network slice instance.

As an option, the one or more chargeable events may be configured for the network slice instance. For example, the one or more chargeable events may be indicated in the definition of the network slice instance. As another example, the one or more chargeable events may be indicated in a charging policy assigned to the network slice instance or assigned to an entity for which the network slice instance has been defined.

In one embodiment, the chargeable events may include creation of the network slice instance. For example, the creation of the network slice instance may include defining of the network slice instance, such through receipt of a definition of the network slice instance. In another embodiment, the chargeable events may include activation (e.g. deployment) of the network slice instance (e.g. within the physical network).

In yet another embodiment, the chargeable events may include modification of the network slice instance. The modification may be made by the entity that defined the network slice instance or by a network operator. As an example, the modification of the network slice instance may include a change to the set of network function instances included in the network slice instance, such as an addition of a new network function instance or a removal of an existing network function instance. In turn, the modification of the network slice instance may change the network service provided by the network slice instance.

As another example, the modification of the network slice instance may include a change to the resources of the physical network required for the set of network function instances included in the network slice instance. This change may include scaling of the resources, in one embodiment. Scaling may refer to defining a minimum available resource capacity and maximum available resource capacity (or an available resource capacity range) for the network slice instance.

As yet another example, the modification of the network slice instance may include includes a priority being defined for the network slice instance. The priority may refer to a priority given to the network slice instance with respect to at least one other network slice instance. In an embodiment, the priority may indicate an order between the network slice instance and another network slice instance by which resources of the shared physical network are assigned to the network slice instance and the other network slice instance. In other words, when the network slice instance competes with at least one other network slice instance for resources in the physical network, the priority may indicate the order among the network slice instance and the other network slice instance(s) by which the resources are assigned or distributed thereto.

In yet a further embodiment, the chargeable events may include de-activation of the network slice instance (e.g. within the physical network). The de-activation may release resources used by the network slice instance, for example. In another embodiment, the chargeable events may include termination of the network slice instance (e.g. within the physical network). The termination may refer to removing the definition of the network slice instance from memory or from an association with the entity for which the network slice instance was defined.

Further, as shown in operation 106, a chargeable event of the one or more chargeable events for the network slice instance is detected, based on the monitoring. For example, an event occurring in association with the network slice instance may be determined to be one of the chargeable events.

Still yet, as shown in operation 108, charging for the chargeable event is triggered. Thus, once the chargeable event is detected, charging for the chargeable event may be triggered. In one embodiment, the charging may be triggered by notifying an online charging system of the chargeable event. The online charging system may then charge for the chargeable event in response to the notification, for example according to the charging policy assigned to the network slice instance or assigned to the entity for which the network slice instance has been defined.

As noted above, the charging is triggered by the NSMF, such that the NSMF which manages the lifecycle of the network slice instance may also be employed as a charging trigger function (CTF) for triggering the charging for any chargeable events detected for the network slice instance. Thus, the CTF may be centrally managed with the lifecycle management functions of the NSMF, and accordingly may not be de-coupled or otherwise separated from the lifecycle management functions of the NSMF.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
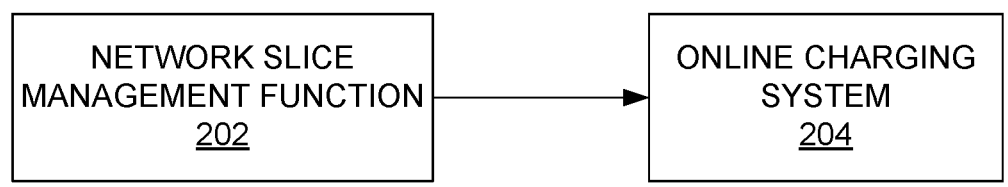
FIG. 2 illustrates a system for managing charging for network slices, in accordance with one embodiment.

FIG. 2 illustrates a system 200 for managing charging for network slices, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, a NSMF 202 is in communication with an online charging system 204. The NSMF 202 and online charging system 204 may be implemented in a same physical network from which a plurality of network slice instances have been defined. The network slice instances may be defined for the same or different entities. The NSMF 202 may similarly be in communication with an offline charging system (not shown).

The NSMF 202 may be composed from the service design and creation center (SDC) visual modeling and design tool by the Open Network Automation Platform (ONAP). Of course, the NSMF 202 may be associated with any network orchestrator. The SDC may map a definition (e.g. profile) of each network slice instance to a network service model. The definition of the network slice instance may be a created using a GSMA Generic Slice Template (GST). The network service model may defines the characteristics, requirements, QoS, etc. of the network service provided by the network slice instance.

The NSMF 202 may also be composed of orchestration components. The orchestration components may include a Service Orchestration (SO) Active and Available Inventory (AAI), policy, etc. which implement lifecycle management for the network slice instances.

To this end, the NSMF 202 manages the lifecycle of each of the network slice instances. During execution of the lifecycle management function of the NSMF 202, the NSMF 202 is able to monitor events occurring in association with each of the network slice instances. In turn, the NSMF 202 is able to detect any of the occurring events that are chargeable, as defined by chargeable events defined each of the network slice instances.

Response to detecting a chargeable event for one of the network slice instances, the NSMF 202 triggers charging for the chargeable event. In particular, the NSMF 202 notifies the online charging system 204 of the chargeable event. The notification may indicate the particular chargeable event that was detected, the particular network slice instances for which the particular chargeable event that was detected, and any other additional information required by the online charging system 204 to charge for the chargeable event.

As described above, charging by the online charging system 204 may be performed according to a charging policy associated with the network slice instance or with the entity for which the network slice instance was defined, and thus may be performed differently for different network slice instances. By providing this event-based charging independently for each specific network slice instances, the charging may not necessarily be limited to charging based on volume, time, or session.

Figure 3:
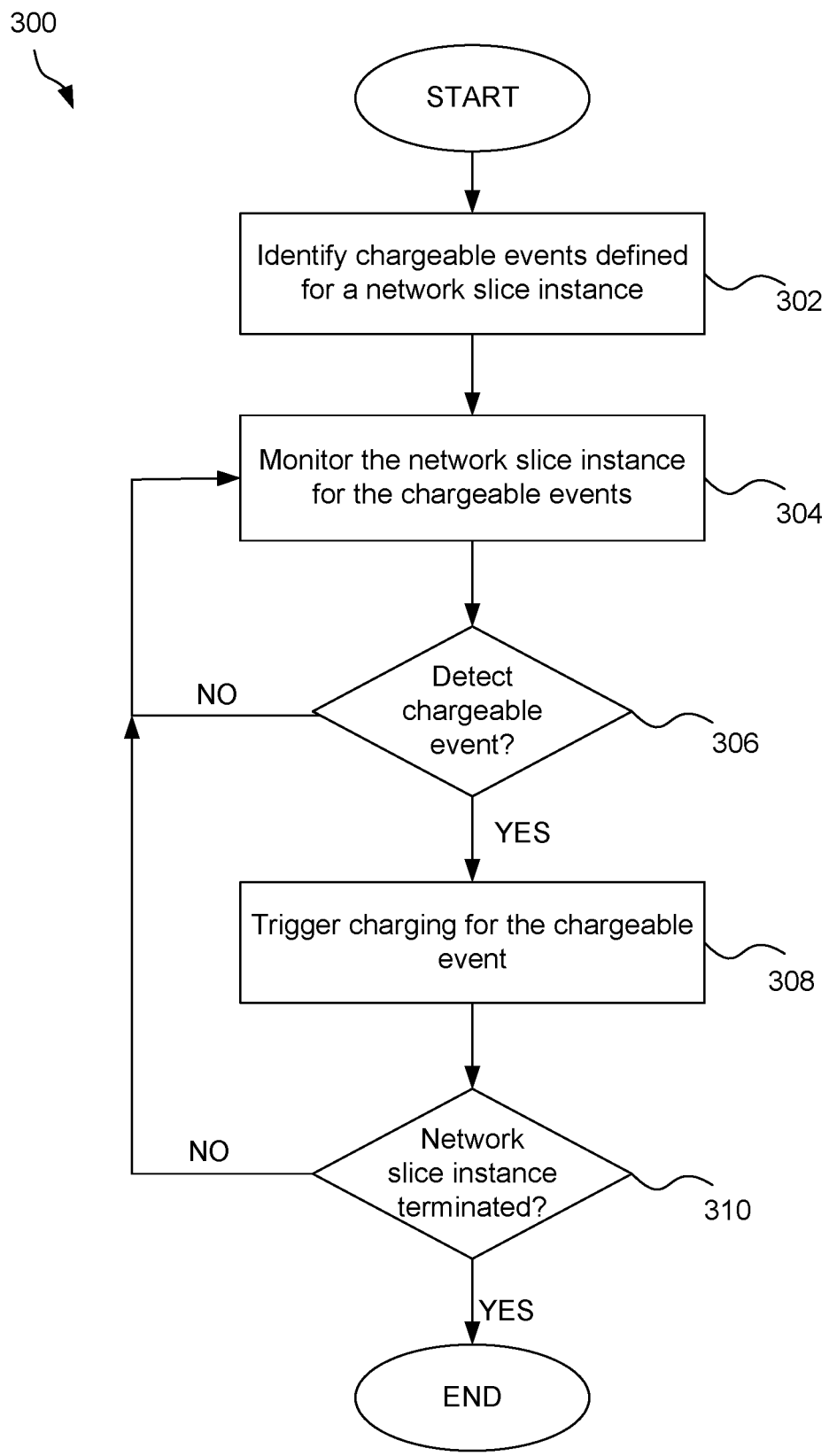
FIG. 3 illustrates a method of the network slice management function of FIG. 2, in accordance with one embodiment.

FIG. 3 illustrates a method 300 of the network slice management function of FIG. 2, in accordance with one embodiment. Of course, the method 300 is just one embodiment of the functionality of the NSMF 202 of FIG. 2.

As shown in operation 302, chargeable events defined for a network slice instance are identified. In one embodiment, the chargeable events may be identified from a policy defining which events are chargeable for the network slice instance.

Additionally, in operation 304, the network slice instance is monitored for the chargeable events. The network slice instance may be monitored during lifecycle management of the network slice instance.

In decision 306, it is determined whether a chargeable event has been detected during the monitoring. Response to determining in decision 306 that a chargeable event has not been detected, the method 300 continues monitoring the network slice instance for chargeable events in operation 304.

Response to determining in decision 306 that a chargeable event has been detected, charging for the chargeable event is triggered (see operation 308). In turn, it is determined in decision 310 whether the network slice instance has been terminated. Responsive to determining in decision 310 that the network slice instance has not been terminated, the method 300 continues monitoring the network slice instance for chargeable events in operation 304. Responsive to determining in decision 310 that the network slice instance has been terminated, the method 300 terminates, and accordingly monitoring of the network slice instance for chargeable events terminates.

Figure 4:
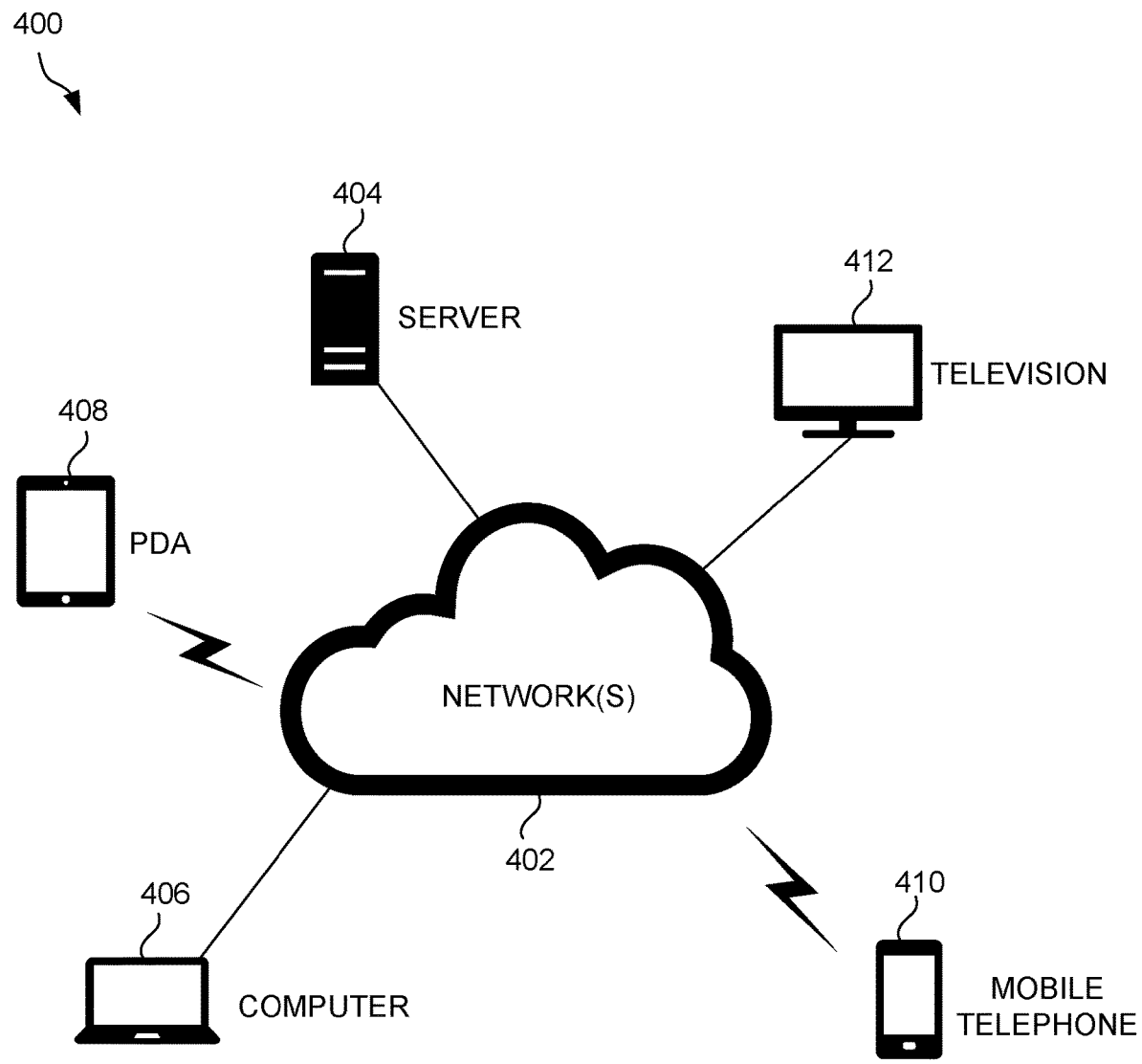
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
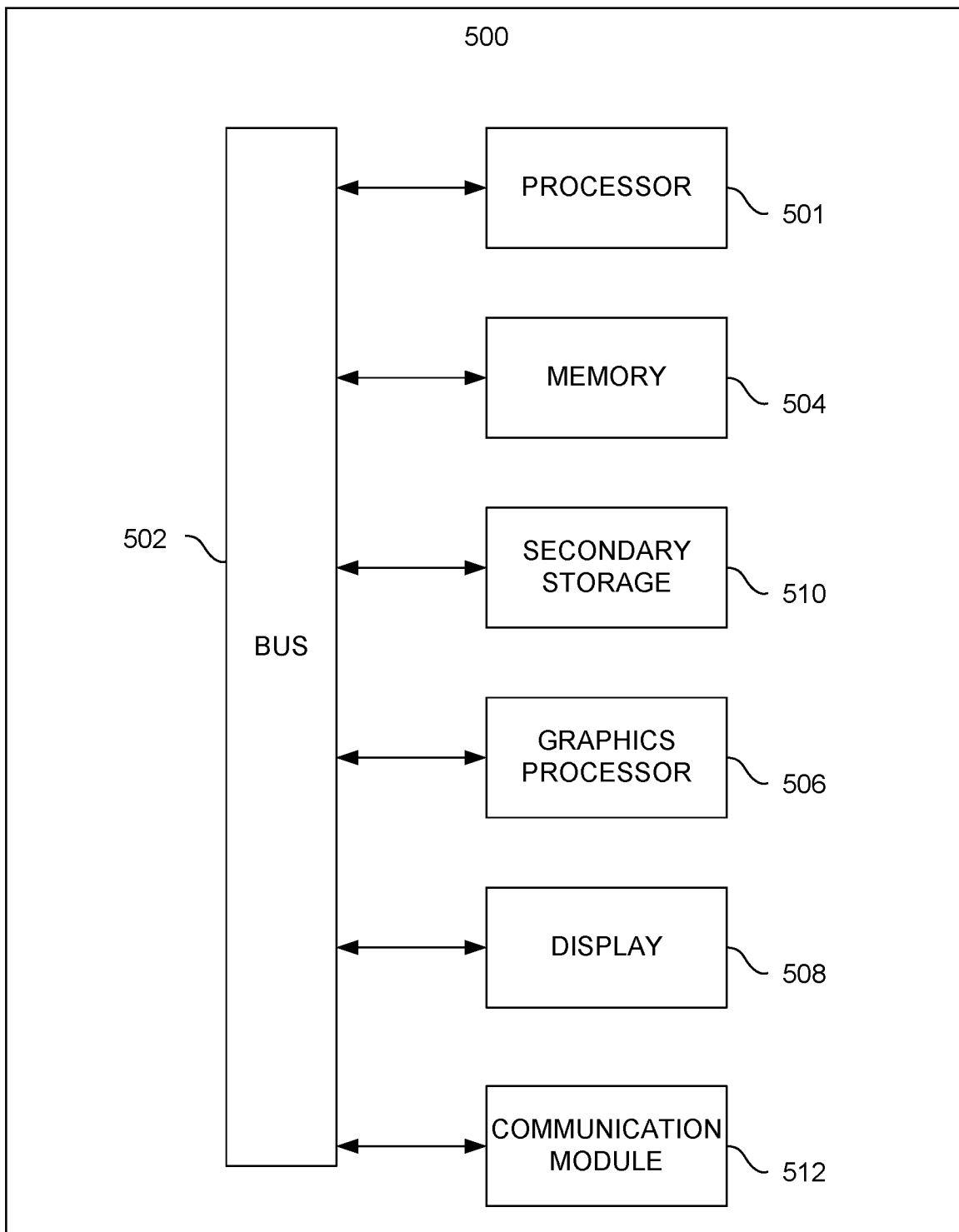
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:
   managing, by a network slice management function, a lifecycle of a network slice instance;
   monitoring, by the network slice management function, the network slice instance for one or more chargeable events;
   detecting, by the network slice management function, a chargeable event of the one or more chargeable events for the network slice instance, based on the monitoring; and
   triggering, by the network slice management function, charging for the chargeable event, wherein the network slice management function that manages the lifecycle of the network slice instance is further employed as a charging trigger function for triggering the charging for the chargeable event;
   wherein the one or more chargeable events include modification of the network slice instance, and wherein the modification of the network slice instance includes at least one of:
   a change to resources of a physical network required for a set of network function instances included in the network slice instance, or
   a priority being defined for the network slice instance.

2. The non-transitory computer readable medium of claim 1, wherein the network slice instance is one of a plurality of network slice instances managed by the network slice management function.

3. The non-transitory computer readable medium of claim 2, wherein the plurality of network slice instances are created from a physical network.

4. The non-transitory computer readable medium of claim 1, wherein the network slice instance includes a set of network function instances and resources of a physical network required for the set of network function instances.

5. The non-transitory computer readable medium of claim 4, wherein the resources include storage and compute resources of the physical network.

6. The non-transitory computer readable medium of claim 1, wherein the one or more chargeable events are configured for the network slice instance.

7. The non-transitory computer readable medium of claim 1, wherein the one or more chargeable events include creation of the network slice instance.

8. The non-transitory computer readable medium of claim 1, wherein the one or more chargeable events include activation of the network slice instance.

9. The non-transitory computer readable medium of claim 1, wherein the one or more chargeable events include de-activation of the network slice instance.

10. The non-transitory computer readable medium of claim 1, wherein the one or more chargeable events include termination of the network slice instance.

11. The non-transitory computer readable medium of claim 1, wherein the modification of the network slice instance includes a change to a set of network function instances included in the network slice instance.

12. The non-transitory computer readable medium of claim 1, wherein the modification of the network slice instance includes the change to resources of the physical network required for the set of network function instances included in the network slice instance.

13. The non-transitory computer readable medium of claim 12, wherein the change to the resources includes a scaling of the resources.

14. The non-transitory computer readable medium of claim 13, wherein the scaling of the resources includes a minimum available resource capacity and maximum available resource capacity being defined for the network slice instance.

15. The non-transitory computer readable medium of claim 1, wherein the modification of the network slice instance includes the priority being defined for the network slice instance.

16. The non-transitory computer readable medium of claim 15, wherein the priority indicates an order between the network slice instance and another network slice instance by which resources of a shared physical network are assigned to the network slice instance and the other network slice instance.

17. A method, comprising:
  managing, by a network slice management function, a lifecycle of a network slice instance;
  monitoring, by the network slice management function, the network slice instance for one or more chargeable events;
  detecting, by the network slice management function, a chargeable event of the one or more chargeable events for the network slice instance, based on the monitoring; and
  triggering, by the network slice management function, charging for the chargeable event, wherein the network slice management function that manages the lifecycle of the network slice instance is further employed as a charging trigger function for triggering the charging for the chargeable event;
  wherein the one or more chargeable events include modification of the network slice instance, and wherein the modification of the network slice instance includes at least one of:
  a change to resources of a physical network required for a set of network function instances included in the network slice instance, or
  a priority being defined for the network slice instance.

18. A system, comprising:
  a non-transitory memory storing instructions; and
  one or more processors in communication with the non-transitory memory that execute the instructions to perform a method comprising:
  managing, by a network slice management function, a lifecycle of a network slice instance;
  monitoring, by the network slice management function, the network slice instance for one or more chargeable events;
  detecting, by the network slice management function, a chargeable event of the one or more chargeable events for the network slice instance, based on the monitoring; and
  triggering, by the network slice management function, charging for the chargeable event, wherein the network slice management function that manages the lifecycle of the network slice instance is further employed as a charging trigger function for triggering the charging for the chargeable event;
  wherein the one or more chargeable events include modification of the network slice instance, and wherein the modification of the network slice instance includes at least one of:
  a change to resources of a physical network required for a set of network function instances included in the network slice instance, or
  a priority being defined for the network slice instance.

* * * * *